(12) United States Patent
Snodgrass et al.

(10) Patent No.: US 8,391,416 B1
(45) Date of Patent: Mar. 5, 2013

(54) SYNCRONIZATION FREQUENCY DIVERSITY RECEPTION UTILIZING A SINGLE RF RECEIVER

(75) Inventors: Timothy E. Snodgrass, Palo, IA (US); Dennis L. Hoffman, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 765 days.

(21) Appl. No.: 12/536,234

(22) Filed: Aug. 5, 2009

(51) Int. Cl.
*H03K 9/00* (2006.01)
*H04L 7/00* (2006.01)

(52) U.S. Cl. ........................... 375/316; 375/354

(58) Field of Classification Search .................. 375/316, 375/354, 326, 130, 145, 149, 357, 267, 259; 370/464, 491, 500, 503
See application file for complete search history.

(56) References Cited

U.S. PATENT DOCUMENTS

| 4,442,527 A * | 4/1984 | Munday | 375/134 |
| 6,779,009 B1 * | 8/2004 | Zuber | 708/422 |
| 2005/0201326 A1 * | 9/2005 | Lakkis | 370/329 |

* cited by examiner

*Primary Examiner* — David C. Payne
*Assistant Examiner* — Vineeta Panwalkar
(74) *Attorney, Agent, or Firm* — Donna P. Suchy; Daniel M. Barbieri

(57) ABSTRACT

A system may include a receiver having a number of reception channels spread across an instantaneous radio frequency bandwidth, each one of the reception channels for receiving a different radio frequency within the instantaneous radio frequency bandwidth. The system may also include control programming for positioning the receiver on one of a number of synchronization frequencies transmitting a synchronization preamble, where a number of reception channels is less than a number of synchronization frequencies, and a probability of not receiving one or more of the synchronization frequencies is smaller than a required message error rate for receiving the plurality of synchronization frequencies.

12 Claims, 4 Drawing Sheets

410 POSITION A RECEIVER ON ONE OF A PLURALITY OF SYNCHRONIZATION FREQUENCIES TRANSMITTING A SYNCHRONIZATION PREAMBLE, THE RECEIVER COMPRISING A PLURALITY OF RECEPTION CHANNELS SPREAD ACROSS AN INSTANTANEOUS RADIO FREQUENCY BANDWIDTH, WHERE THE PLURALITY OF RECEPTION CHANNELS COMPRISES A NUMBER OF RECEPTION CHANNELS LESS THAN A NUMBER OF SYNCHRONIZATION FREQUENCIES

420 RECEIVE A DIFFERENT RADIO FREQUENCY ON EACH ONE OF THE PLURALITY OF RECEPTION CHANNELS SPREAD ACROSS THE INSTANTANEOUS RADIO FREQUENCY BANDWIDTH, WHERE A PROBABILITY OF NOT RECEIVING ONE OR MORE OF THE PLURALITY OF SYNCHRONIZATION FREQUENCIES IS SMALLER THAN A REQUIRED MESSAGE ERROR RATE FOR RECEIVING THE PLURALITY OF SYNCHRONIZATION FREQUENCIES.

FIG. 4

SYNCRONIZATION FREQUENCY DIVERSITY RECEPTION UTILIZING A SINGLE RF RECEIVER

TECHNICAL FIELD

The present disclosure generally relates to the field of radio frequency receivers, and more particularly to a radio frequency receiver for receiving a synchronization preamble transmitted on a number of different radio frequencies.

BACKGROUND

Link 16 is an inter-computer data exchange format. In order to communicate via Link 16, multiple receivers are often utilized to receive the multiple frequencies of a Link 16 waveform preamble transmission. For example, two independent radio frequency receivers may be utilized to receive a Link 16 waveform preamble. Utilizing multiple receivers may increase radio costs for equipment that communicates via Link 16 and/or other communication protocols transmitted via multiple frequencies.

SUMMARY

A system may include a receiver having a number of reception channels spread across an instantaneous radio frequency bandwidth, each one of the reception channels for receiving a different radio frequency within the instantaneous radio frequency bandwidth. The system may also include control programming for positioning the receiver on one of a number of synchronization frequencies transmitting a synchronization preamble, where the number of reception channels is less than the number of synchronization frequencies, and the probability of not receiving one or more of the synchronization frequencies is smaller than a required message error rate for receiving the synchronization frequencies.

A method may include positioning a receiver on one of a number of synchronization frequencies transmitting a synchronization preamble. The receiver may comprise a number of reception channels spread across an instantaneous radio frequency bandwidth, where the number of reception channels is less than the number of synchronization frequencies. A different radio frequency may be received on each one of the reception channels spread across the instantaneous radio frequency bandwidth. The probability of not receiving one or more of the synchronization frequencies may be smaller than a required message error rate for receiving the synchronization frequencies.

A system may include a means for receiving one or more of a number of synchronization frequencies transmitting a synchronization preamble. The receiving means may include a number of reception channels spread across an instantaneous radio frequency bandwidth. The system may also include a means for positioning the receiving means on one of the synchronization frequencies transmitting the synchronization preamble, where the number of reception channels is less than the number of synchronization frequencies, and the probability of not receiving one or more of the synchronization frequencies is smaller than a required message error rate for receiving the synchronization frequencies.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 4 is a flow diagram illustrating a method in accordance with the present disclosure.

DETAILED DESCRIPTION

Reference will now be made in detail to the subject matter disclosed, which is illustrated in the accompanying drawings.

Figure 1:
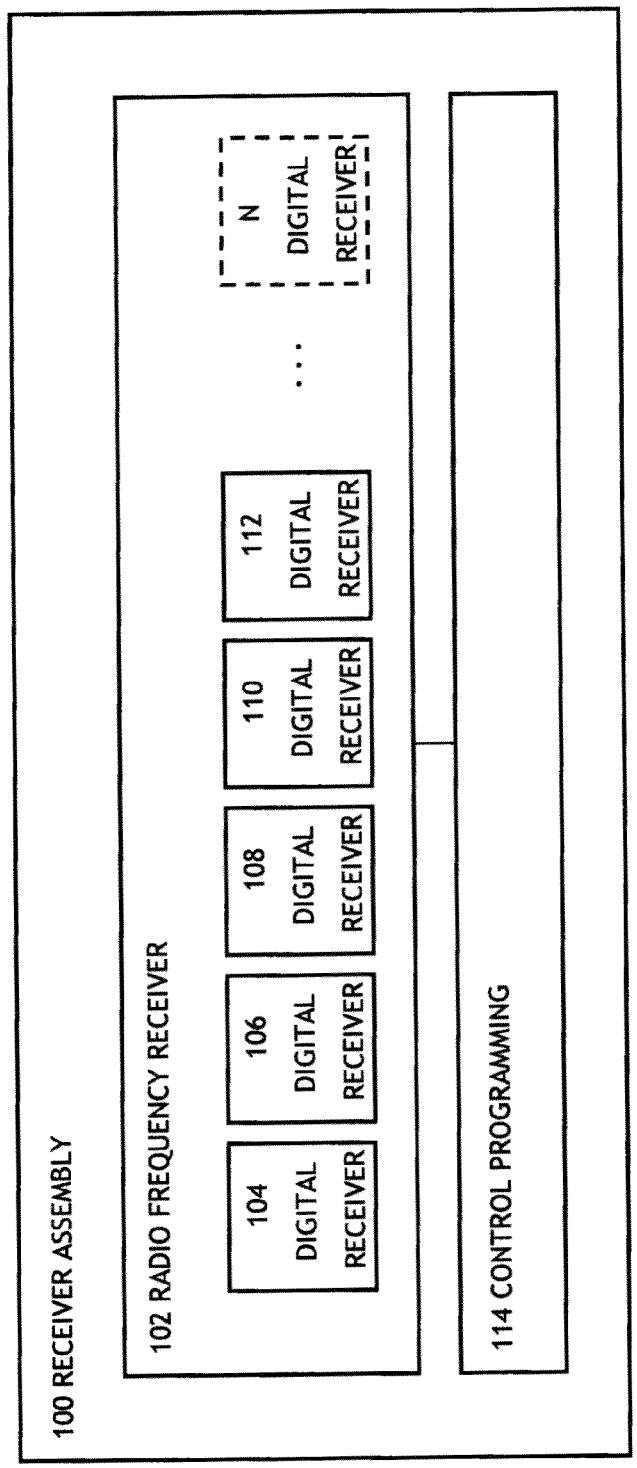
FIG. 1 is a block diagram illustrating a receiver assembly in accordance with the present disclosure.
Figure 2:
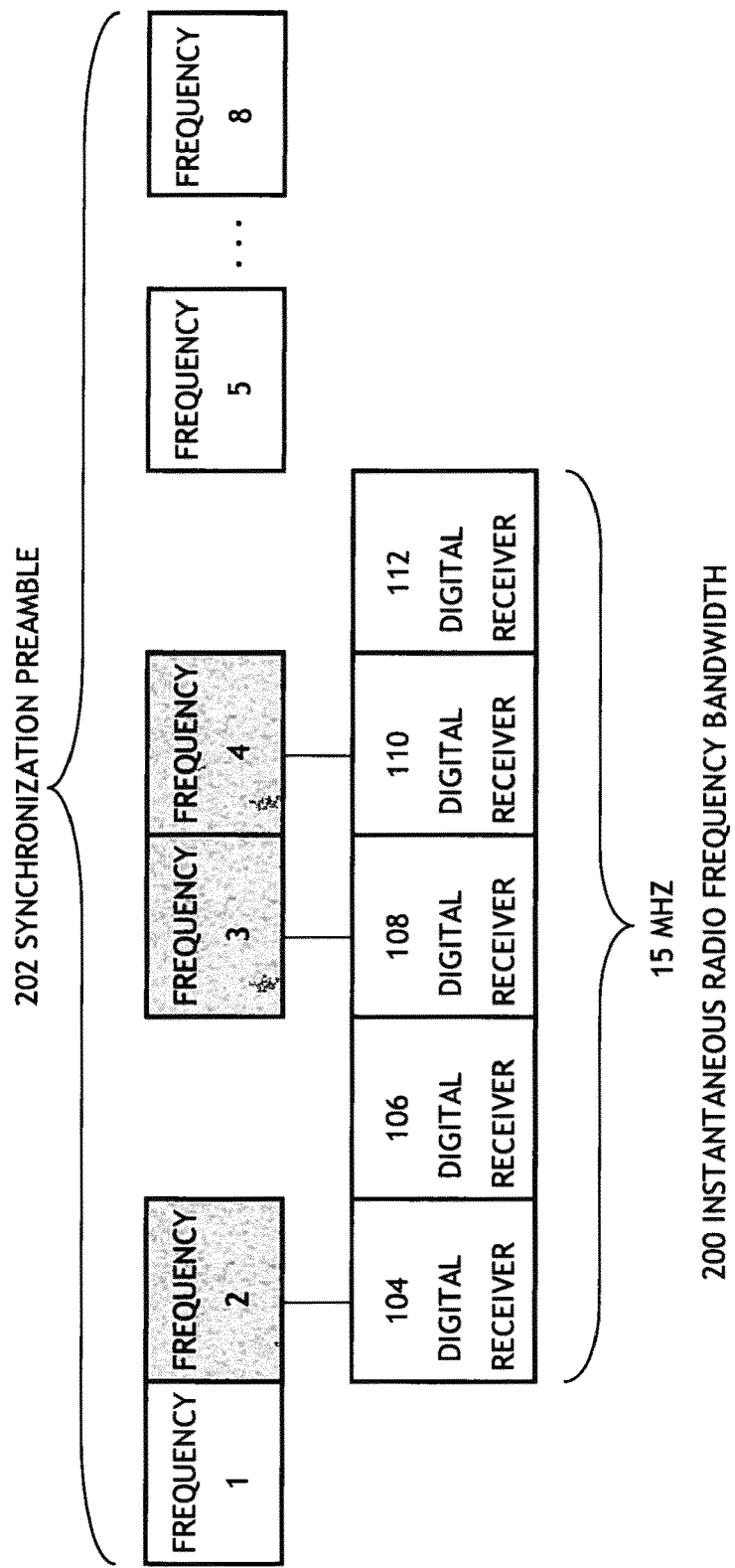
FIG. 2 is a block diagram illustrating a synchronization preamble and the instantaneous radio frequency bandwidth of a receiver assembly positioned on a selected frequency of the synchronization preamble.
Figure 3:
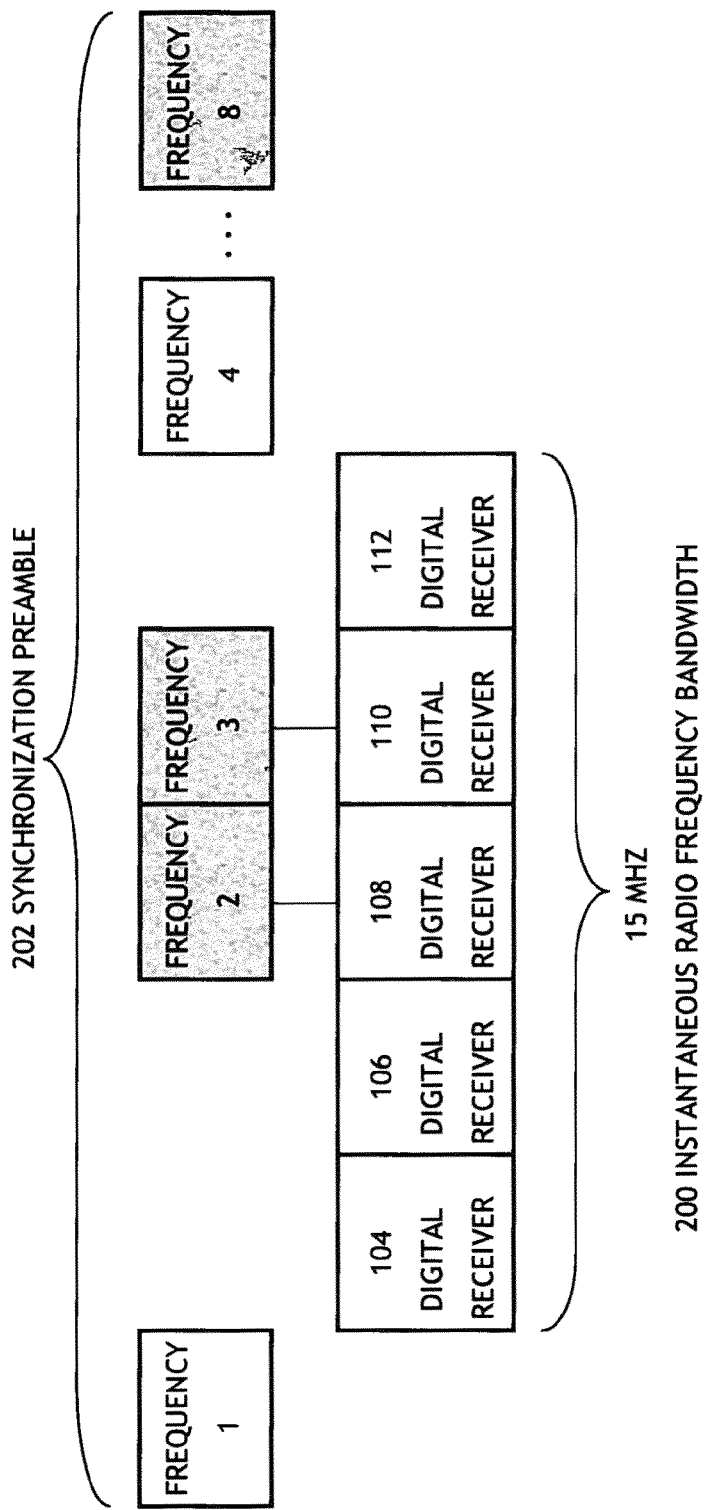
FIG. 3 is another block diagram illustrating a synchronization preamble and the instantaneous radio frequency bandwidth of a receiver assembly positioned on a selected frequency of the synchronization preamble.

Referring generally to FIGS. 1 through 3, a receiver assembly 100 is described in accordance with the present disclosure. The receiver assembly 100 includes a receiver, such as Radio Frequency (RF) receiver 102. The RF receiver 102 includes one or more reception channels (e.g., digital receivers 104, 106, 108, 110, and 112) spread across an instantaneous radio frequency bandwidth, such as the 15 MHz instantaneous bandwidth 200. Each one of the digital receivers 104, 106, 108, 110, and 112 is configured for receiving a different radio frequency within the instantaneous radio frequency bandwidth, as illustrated in FIGS. 2 and 3, where the digital receivers 104, 106, 108, 110, and 112 are each assigned a separate radio frequency within the 15 MHz range of the instantaneous bandwidth 200.

The receiver assembly 100 is configured for receiving a synchronization preamble 202, which is transmitted on more than one synchronization frequency (e.g., synchronization frequencies 1 through 8, as illustrated in FIGS. 2 and 3). In embodiments, the number of reception channels is less than the number of synchronization frequencies, but the synchronization preamble 202 is limited to transmission on several different frequencies selected from a given bandwidth of all possible frequencies during each pre-specified period of transmission (time slot). In the embodiments illustrated in FIGS. 2 and 3, the synchronization preamble 202 is transmitted on three frequencies of a possible eight frequencies during each time slot. The RF receiver 102 is positioned on one of these synchronization frequencies during each time slot for receiving the synchronization preamble 202.

For example, as illustrated in FIG. 2, during a first time slot, the instantaneous bandwidth 200 of the RF receiver 102 is positioned on one of the eight possible frequencies transmitting the synchronization preamble 202 (e.g., the Link 16 waveform preamble transmission). Thus, digital receiver 104 is configured to receive frequency 2, digital receiver 108 is configured to receive frequency 3, and digital receiver 110 is configured to receive frequency 4 of eight possible frequencies for the synchronization preamble 202. In this embodiment, where the synchronization preamble 202 is transmitted on these same frequencies during the first time slot, the RF receiver 102 is capable of receiving the entire portion of the synchronization preamble 202 transmitted during that time period (excepting noise, interference, or the like).

As illustrated in FIG. 3, during a second time slot, the instantaneous bandwidth 200 of the RF receiver 102 is positioned on another one of the eight possible frequencies transmitting the synchronization preamble 202. Thus, digital receiver 108 is configured to receive frequency 2 and digital receiver 110 is configured to receive frequency 3 of eight possible frequencies for the synchronization preamble 202. In this embodiment, where the synchronization preamble 202 is transmitted on frequencies 2, 3, and 8 during the second time slot, the RF receiver 102 may receive only a portion of the synchronization preamble 202 transmitted during that time period, namely the portion transmitted on frequencies 2 and 3.

The receiver assembly 100 includes control programming 114 for positioning the RF receiver 102 on one of the possible frequencies transmitting the synchronization preamble 202. In a specific embodiment, each one of the digital receivers 104, 106, 108, 110, and 112 is configurable via the control programming to receive a Link 16 channel, and the synchronization preamble 202 comprises a Link 16 waveform synchronization preamble. In one embodiment, the control programming 114 may comprise machine-executable code stored on a computer chip, in the memory/registers of a computer processor, and/or on a machine-readable drive, such as a flash drive, a disk drive, or the like. The control programming 114 may comprise logic for selecting one of the frequencies of the synchronization preamble 202. For example, in one embodiment, the control programming 114 may utilize Digital Signal Processing (DSP) to analyze the synchronization preamble 202 and select an appropriate frequency.

Because the synchronization frequencies selected to transmit a Link 16 waveform synchronization preamble are deterministic during each time slot, the control programming 114 may be configured to position the RF receiver 102 on a certain one of the synchronization frequencies, such that the probability of not receiving at least two of the eight frequencies chosen by the Link 16 waveform synchronization preamble is more than an order of magnitude smaller than the required message error rate for this transmission scheme. For example, in the case of the Link 16 waveform synchronization preamble, there are 51 frequencies available to choose from. Out of these 51 frequencies, eight may be selected utilizing a pseudo-random selection algorithm. Because each of the eight selections may be unique from the other seven, the probability of two frequencies being chosen within 5 channels of one another is very high. This was verified by collecting 200,000 samples.

Referring now to FIG. 4, a method 400 is described in accordance with the present disclosure. First, a receiver is positioned on one of a number of synchronization frequencies transmitting a synchronization preamble. The receiver may comprise a number of reception channels spread across an instantaneous radio frequency bandwidth, where the number of reception channels is less than the number of synchronization frequencies, 410. Then, a different radio frequency is received on each one of the reception channels spread across the instantaneous radio frequency bandwidth. The probability of not receiving one or more of the synchronization frequencies is smaller than a required message error rate for receiving the synchronization frequencies, 420. For the purposes of the present disclosure, the probability of not receiving one or more of the synchronization frequencies (which is smaller than a required message error rate for receiving the synchronization frequencies) may be defined in an opposite sense as receiving at least a sufficient number of synchronization frequencies to achieve a sufficiently robust synchronization, such that the message error rate is smaller than a requirement.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system, comprising:
   a single receiver comprising a plurality of reception channels spread across an instantaneous radio frequency bandwidth of 15 MHz, each one of the plurality of reception channels for receiving a different radio frequency within the instantaneous radio frequency bandwidth, each one of the plurality of reception channels includes a Link 16 channel; and
   control programming for positioning the single receiver on one of a plurality of synchronization frequencies transmitting a synchronization preamble, wherein the plurality of reception channels comprises a number of reception channels less than a number of synchronization frequencies, and a probability of not receiving one or more of the plurality of synchronization frequencies is at least an order of magnitude smaller than a required message error rate for receiving the plurality of synchronization frequencies.

2. The system of claim 1, wherein the plurality of synchronization frequencies comprises eight different radio frequencies.

3. The system of claim 1, wherein the one or more of the plurality of synchronization frequencies not received comprises at least two radio frequencies.

4. The system of claim 1, wherein the synchronization preamble comprises a Link 16 waveform synchronization preamble.

5. A method, comprising:
   positioning a single receiver on one of a plurality of synchronization frequencies transmitting a synchronization preamble, the single receiver comprising a plurality of reception channels spread across an instantaneous radio frequency bandwidth, the instantaneous radio frequency bandwidth having a bandwidth of 15 MHz, each of the plurality of reception channels includes a Link 16 channel, where a number of reception channels is less than a number of synchronization frequencies; and
   receiving a different radio frequency on each one of the plurality of reception channels spread across the instantaneous radio frequency bandwidth, where a probability of not receiving one or more of the plurality of synchronization frequencies is at least an order of magnitude smaller than a required message error rate for receiving the plurality of synchronization frequencies.

6. The method of claim 5, wherein the plurality of synchronization frequencies comprises eight different radio frequencies.

7. The method of claim 5, wherein the one or more of the plurality of synchronization frequencies not received comprises at least two radio frequencies.

8. The method of claim 5, wherein the synchronization preamble comprises a Link 16 waveform synchronization preamble.

9. A system, comprising:
   means for receiving one or more of a plurality of synchronization frequencies transmitting a synchronization preamble, the receiving means comprising a plurality of reception channels spread across an instantaneous radio frequency bandwidth; and
   means for positioning the receiving means on one of the plurality of synchronization frequencies transmitting the synchronization preamble,
   wherein a number of reception channels is less than a number of synchronization frequencies, and a probability of not receiving one or more of the plurality of synchronization frequencies is at least an order of magnitude smaller than a required message error rate for receiving the plurality of synchronization frequencies.

10. The system of claim 9, wherein the instantaneous radio frequency bandwidth comprises a radio frequency bandwidth of 15 MHz.

11. The system of claim 9, wherein the plurality of reception channels comprises five Link 16 channels.

12. The system of claim 9, wherein the plurality of synchronization frequencies comprises eight different radio frequencies.

\* \* \* \* \*